Sept. 28, 1926.  1,601,578
S. G. NEAL ET AL
AIR BRAKE APPARATUS
Filed Oct. 9, 1924  4 Sheets-Sheet 1

Fig.1.
Full Release and Brake Pipe Reservoir Charging

INVENTORS
Spencer G. Neal.
William Astle.
Edward P. Wilson.
BY
ATTORNEYS

Sept. 28, 1926.

S. G. NEAL ET AL 1,601,578

AIR BRAKE APPARATUS

Filed Oct. 9, 1924    4 Sheets-Sheet 2

Fig. 2.
Service Lap

INVENTORS
Spencer G. Neal.
William Astle.
Edward P. Wilson.
BY
ATTORNEYS

Sept. 28, 1926.

S. G. NEAL ET AL 1,601,578

AIR BRAKE APPARATUS
Filed Oct. 9, 1924

Fig.3.
Emergency

INVENTORS
Spencer G. Neal.
William Astle.
Edward P. Wilson.
BY
ATTORNEYS

Patented Sept. 28, 1926.

1,601,578

UNITED STATES PATENT OFFICE.

SPENCER G. NEAL, OF NEW YORK, WILLIAM ASTLE, OF BROOKLYN, NEW YORK, AND EDWARD P. WILSON, OF EAST ORANGE, NEW JERSEY, ASSIGNORS TO AUTOMATIC STRAIGHT AIR BRAKE COMPANY, OF WILMINGTON, DELAWARE, A CORPORATION OF DELAWARE.

AIR-BRAKE APPARATUS. REISSUED

Application filed October 9, 1924, Serial No. 742,560. Renewed July 13, 1926.

This invention relates to improvements in that type of air brake apparatus illustrated by Patents Nos. 1,502,521 and 1,502,520, dated July 22, 1924. In the type of air brake apparatus illustrated by these patents the brake pipe volume is augmented by a brake pipe reservoir, air from the brake pipe and from the augmenting brake pipe reservoir being admitted to the brake cylinder for service applications of the brakes. An emergency reservoir is provided and the air from said emergency reservoir is admitted to the brake cylinder for emergency applications of the brakes and is also admitted into the brake pipe for a quick release of the brakes. The triple valve is operated to service position by a slow and moderate reduction of brake pipe pressure, and operates to emergency position by a sudden reduction in brake pipe pressure. An increase in brake pipe pressure operates the triple valve to release position.

One of the important objects of the present invention is to provide a service application valve which in service position will admit brake pipe air and brake pipe reservoir air directly to the brake cylinder for a service application of the brakes, said service application valve being controlled in its movements by brake pipe, emergency reservoir and brake cylinder pressures.

Another object of this invention is to provide a triple valve with a service application valve operating in such manner that the brake cylinder pressure may be built up in direct relation to the rapidity of cycling operations, said build-up of brake cylinder pressure being controlled entirely and solely by the operation of the service application valve.

A further important object of the invention is to provide an emergency reservoir valve which, when the main slide valve is in emergency position, will be opened to permit the emergency reservoir air to flow to the brake cylinder, and which, when the main slide valve is in full release position, will be opened to permit the emergency reservoir air to flow to the brake pipe. The main slide valve in full release position and in emergency position controls the direction of flow of emergency reservoir air past the emergency reservoir valve. A manually operable release governing valve is provided, and by means of said valve the triple valve may be adjusted to operate in quick release or to operate in graduated release. When the release governing valve is in graduated release position it will prevent the main slide valve in full release position opening the emergency reservoir valve and the release of brake cylinder pressure during graduated release operations will be wholly controlled by the service application valve.

There are many other important objects and advantages of the present invention, all of which will fully hereinafter appear.

In order to simplify the description of the triple valve, the various parts and the ports and passages will not be specifically described except in connection with the various operations of the triple valve.

*Full release and brake pipe reservoir charging position and operation (Fig. 1).*

Figure 1:
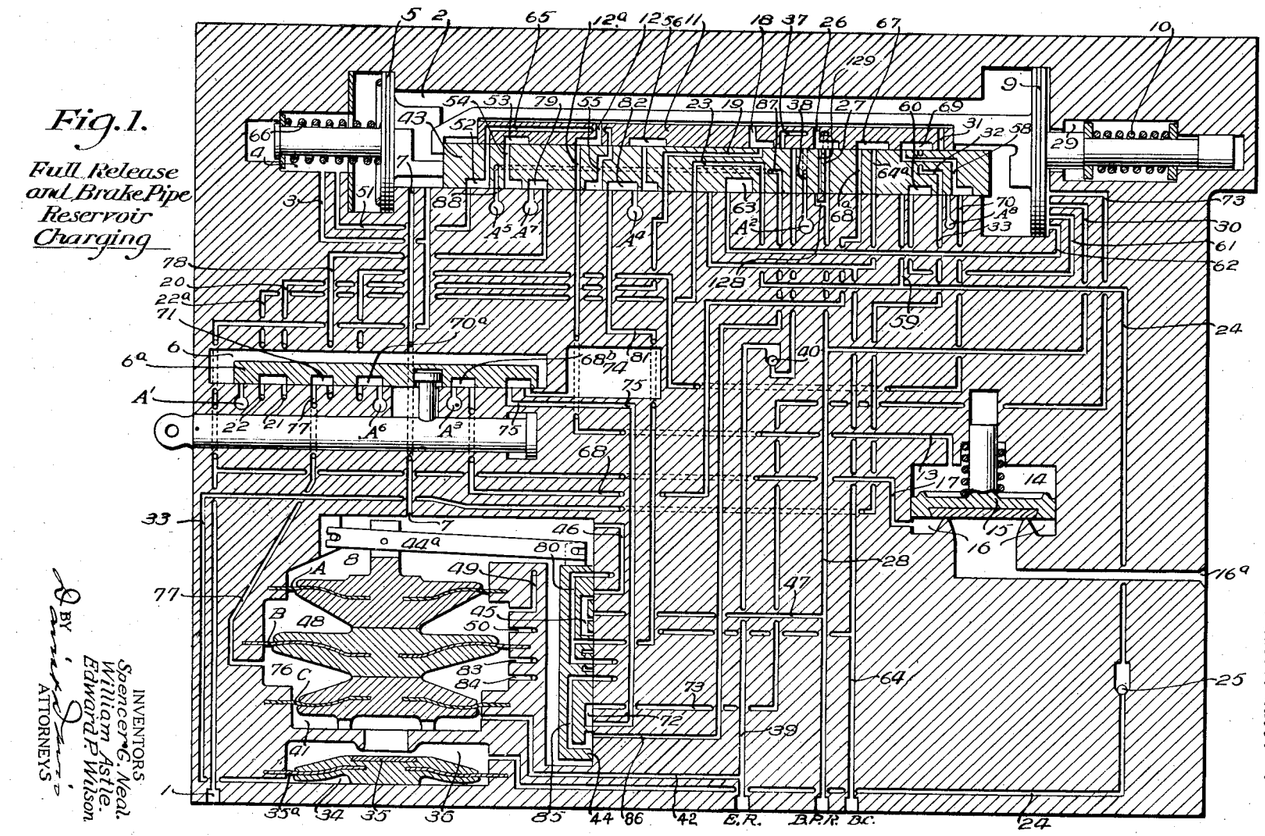
Fig. 1 is a diagrammatic view of a triple valve constructed in accordance with this invention, the parts being shown in full release and brake pipe reservoir charging position, the release governing valve being in quick release position.

When charging the system air passes from the brake pipe through passage 1 to the main brake pipe chamber 2 in which are arranged the main and supplemental valves. Brake pipe air flows from passage 1 through passage 3 into the supplemental brake pipe chamber 4. As the pressure equalizes on opposite sides of the supplemental emergency piston 5, said piston is inoperative at this time, that is to say it does not move. From the chamber 2 brake pipe pressure flows to the release governing valve chamber 6 through passage 7. Passage 7 is continued around the release governing valve and into the actuating chamber 8 of the service application valve so that brake pipe air will flow into said chamber. The pressure of air in chamber 2 forces the larger emergency and release piston 9 toward the right, compressing the emergency spring 10. The supplemental slide valve 11 is connected to the stem of the piston 9 and moves with it. The main slide valve is connected to the piston stem of the supplemental emergency piston 5 and moves with said piston. In the release and charging position of the main slide valve, piston 5 is at the innermost limit of its movement and rests against a shoulder in the valve casing and is held in that position by a supplemental emergency spring arranged in the supplemental brake pipe chamber 4.

Air flows from the chamber 2 through port 12 of the supplemental slide valve, port 12ª of the main slide valve, passage 13 to chamber 14 in which is arranged the brake pipe vent valve 15, and holds said valve to its seat. Brake pipe pressure is registered in chamber 16 beneath valve 15 through passage 17 which is connected directly to brake pipe passage 1. The brake pipe vent valve is provided with a spring, which tends to hold it seated. The spring and the superior downward force on valve 15 hold the valve to its seat except in emergency application, as will be hereinafter described. Air from chamber 2 passes through port 18 of the supplemental slide valve, port and passage 19 of the main slide valve, passage 20 to port 21 in the seat of the release governing valve 6ª. Port 21 is closed when the release governing valve is in graduated release position. In the quick release position of the valve 6ª port 21 is connected to a port 22 by a cavity in the release governing valve. Port 22 is connected by passage 22ª to port and passage 23 of the main slide valve and by passage 24 to a supplemental emergency reservoir chamber 36. In the passage 24 is arranged a check valve 25 which prevents the flow of air from port 22 to the chamber 36, said check valve permitting the flow of air in the reverse direction. The check valve 25 prevents the passage of air to chamber 36 during the charging operation.

The brake pipe reservoir is charged from chamber 2 through port 26 of the supplemental slide valve, port 27 of the main slide valve and passage 28. A brake pipe reservoir chamber 29 is formed on the opposite side of piston 9 from the main brake pipe chamber 2 and this chamber 29 is connected to the brake pipe reservoir passage 28 by a passage 30 so that brake pipe reservoir pressure will be registered in chamber 29, said pressure opposing the brake pipe pressure in chamber 2. When the brake pipe reservoir pressure in chamber 29 equalizes with the brake pipe pressure in chamber 2 the emergency spring 10 will move the piston 9 and the supplemental slide valve 11 to emergency reservoir charging position.

*Emergency reservoir charging (Figs. 1 and 4).*

In the emergency reservoir charging position of the supplemental slide valve the pressure of the spring 10 is taken up by two stop shoulders on the stem of the piston 9 and ceases to exert any force tending to move the piston. In this position of the piston 9 an abutment thereon engages the end of the main slide valve (see Fig. 4). In this position of the valves the air pressures on opposite sides of the pistons 5 and 9 are at an equality. Air from chamber 2 will pass through port 31 of the supplemental slide valve, port 32 of the main slide valve, passage 33 to the emergency reservoir control chamber 34. The control chamber 34 is separated from the supplemental reservoir chamber 36 by a diaphragm 35ª which carries an emergency reservoir valve 35. Valve 35 controls a passage connecting the emergency reservoir to the chamber 36, as will be fully hereinafter set forth. Chamber 36 is at this time vented to atmosphere through passage 24, past check valve 25, through port and passage 23 of the main slide valve, passage 22ª to port 22 of the release governing valve seat. In the graduated release position of the release governing valve 6ª port 22 is connected to atmosphere through a cavity in said valve and an atmospheric port A¹ (see Fig. 6). In the quick release position of the valve 6ª port 22 is connected by the cavity in the valve 6ª to port 21, passage 20, port and passage 19 of the main slide valve, port and passage 37 of the supplemental slide valve, port 38 of the main slide valve and atmospheric port A².

The emergency reservoir is charged from chamber 2 through port 26 of the supplemental slide valve, port 26ª of the main slide valve, passage 39, past check valve 40 to the reservoir. The emergency reservoir chamber 41 of the application valve is connected directly to the emergency reservoir through passage 42. Chamber 41 is directly connected to the supplemental emergency reservoir chamber 36 through a passage controlled by the emergency reservoir valve 35. When the emergency reservoir pressure equals the pressure of the brake pipe and of the brake pipe reservoir the system is fully charged and the parts are then in the position shown in Fig. 2, the fully charged and running position being the same as service lap position.

*Service application position (Figs. 2 and 7).*

The service application valve 44 is operatively connected by a lever 44ª to a pulsating diaphragm structure. This structure consists of an actuating diaphragm A, an equalizing diaphragm B and an emergency diaphragm C. The actuating diaphragm forms one wall of the actuating chamber 8 in which chamber is arranged the operating lever 44ª. Between the diaphragms A and B is formed an equalizing brake cylinder chamber 48 and between the diaphragms B and C is formed a retention chamber 76. Below the emergency reservoir diaphragm C is formed the emergency reservoir chamber 41, hereinbefore referred to. A rigid wall separates the chamber 41 from the supplemental emergency reservoir chamber 36, and the emergency reservoir valve 35 controls a passage through said wall. The service application valve moves in response to variations of pressure in the chambers formed by the said diaphragms, as will be fully described herein. The equalizing diaphragm B is larger in diameter than the actuating diaphragm and the emergency diaphragm. The emergency diaphragm C is smaller in area than the actuating diaphragm A. The equalizing diaphragm B is larger in area than the actuating diaphragm and the emergency diaphragm in order that the desired brake cylinder pressure will be built up in the brake cylinder before the service application valve is moved to lap position, as hereinafter described. The emergency reservoir diaphragm C is slightly smaller than the actuating diaphragm A in order that when there is an equality of pressures in chamber 8 and chamber 41 the diaphragm will be moved to hold the service application valve in release position. This ensures the release position of the service application valve when the system is fully charged. The diaphragm structure has a slight longitudinal movement and fixed rigid stops are provided to arrest the diaphragm structure and the service valve in application position and in release position.

Figure 2:
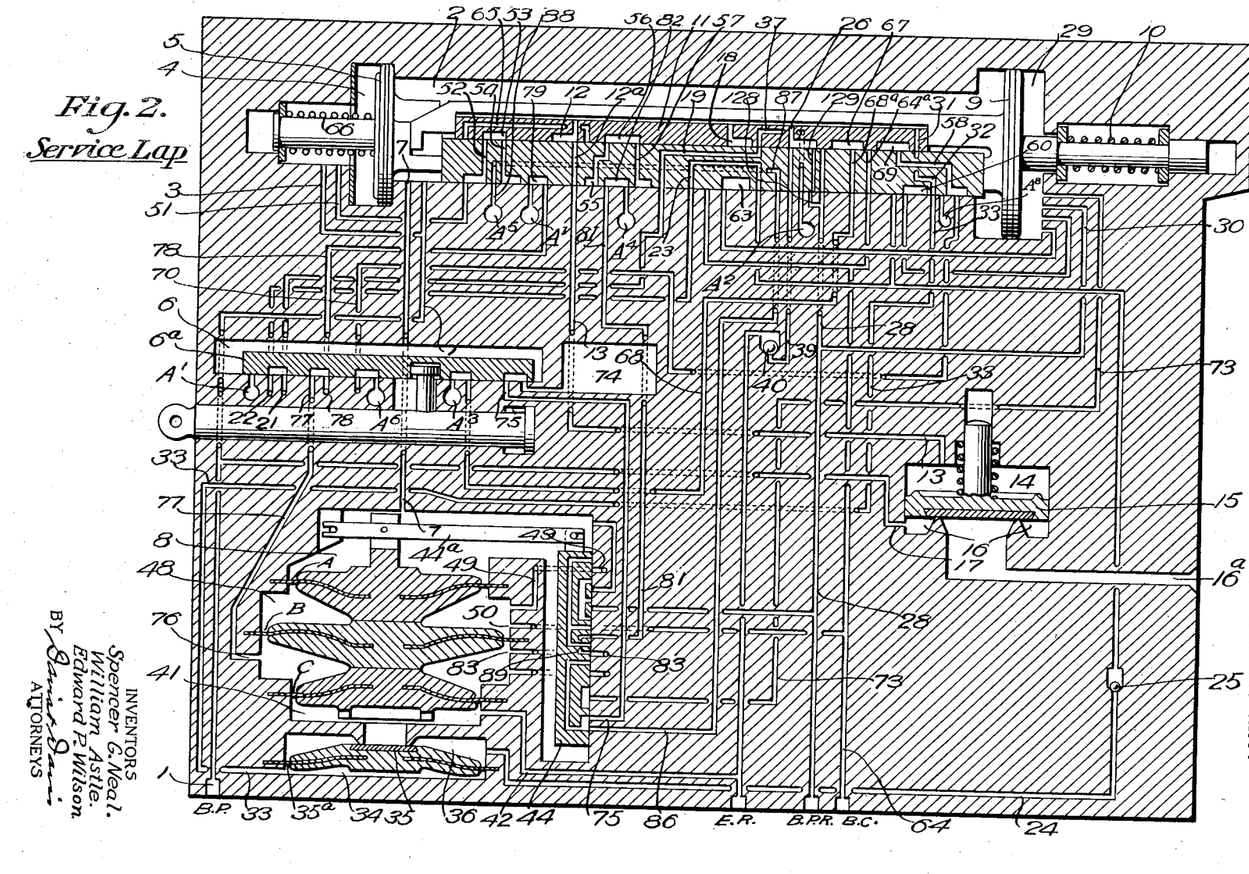
Fig. 2 a view similar to Fig. 1 showing the parts in service lap position.
Figure 7:
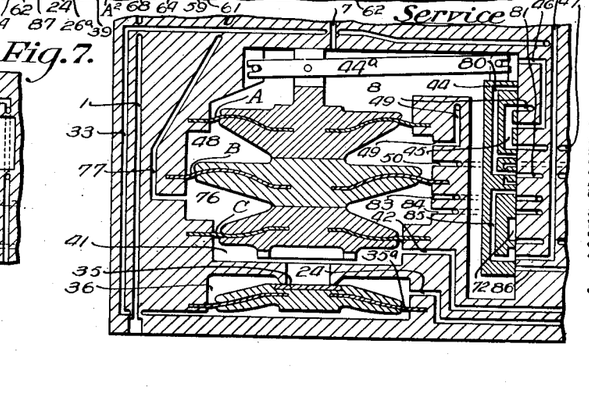
Fig. 7 a detail diagrammatic view of the service application valve in service position.

When a service application of the brakes is desired a service reduction in brake pipe pressure is made in the usual manner through the engineer's brake valve and results in a reduction of pressure in chambers 2, 4 and 8. As the pressure in chambers 2 and 4 will be reduced uniformly there will be no tendency to move the piston 5. A service reduction of pressure in chamber 2 will not create a sufficient differential of pressure in chambers 29 and 2 to cause a movement of the piston 9. The emergency spring 10 and the supplemental emergency spring operating on the piston 5 will hold the piston 9 and the main slide valve from movement and these pistons and the slide valves will remain in the positions shown in Fig. 2. The reduced brake pipe pressure in chamber 8 will be over-balanced by the undisturbed emergency reservoir pressure in chamber 41 and the diaphragms will be moved upwardly and the valve 44 will be moved to service position, as shown in Fig. 7. Brake pipe air will flow to the mingling chamber 45 through passage 46 which leads into brake pipe chamber 8. Brake pipe reservoir air will flow into the mingling chamber through passage 47 which is connected directly to brake pipe reservoir passage 28. From the mingling chamber 45 air will flow to the brake cylinder equalizing chamber 48 through passage 49. From the chamber 48 air will flow to the brake cylinder through passage 50 which connects directly to brake cylinder passage 64. When the proper brake cylinder pressure is developed in chamber 48 in proportion to the brake pipe reduction registered in chamber 8 the diaphragms and the valve 44 return to lap position as shown in Fig. 2, in which position the flow of air to the brake cylinder is stopped. Should the brake cylinder pressure be lowered through leakage the balance of pressures in the diaphragm structure is destroyed and the diaphragms and the valve 44 will again assume service position and the brake cylinder pressure will be again built up to the desired pressure and in proportion to the brake pipe pressure reduction in chamber 8. If it be desired to increase the brake cylinder pressure a further reduction of brake pipe pressure in chamber 8 will result in the service valve moving to application position with the result that the brake cylinder pressure will be built up in proportion to the brake pipe reduction.

When the service valve 44 is in application position brake pipe reservoir air flows to the brake cylinder through the mingling chamber 45 and passage 49, as herein described. The result of this is that the pressure in the brake pipe reservoir chamber 29 is reduced. As chamber 2 and chamber 29 are connected to the mingling chamber there will be a substantial equalization of pressures in said chambers while the valve 44 is in application position. The service application valve will respond practically instantly to the reduction of pressure in chamber 8 with the result that the pressure in chamber 29 will be connected to the mingling chamber and to chamber 2, through chamber 8 and passage 7, before there can be a sufficient reduction of pressure in chamber 2 to cause a movement of the piston 9 and the main and supplemental slide valves. Should there be a tendency for the brake pipe reservoir pressure in chamber 29 to move the piston to the left, during a service operation, against the resistance of the two springs and friction of the main slide valve, a slight movement of the main slide valve will place port 129 of the main slide valve in connection with the port 128, which port is an extension of passage 28. Port 129 is in connection with port and passage 26 of the supplemental slide valve, and this port is in communication with chamber 2. Air may then pass from chamber 29 through passage 30, passage 28, port 128, port 129, and port 26 into the chamber 2. Port 129 is of the proper size to permit an approximate equalization of pressures in chambers 29 and 2 during a service reduction of pressure in chamber 2. This arrangement of ports will also serve to relieve the brake pipe reservoir in chamber 29 of an over-charge and will also prevent undesired emergency action. When, however, an emergency reduction of brake pipe pressure is made port 129 will pass over port 128 without appreciable loss of pressure in chamber 29.

During the service operation the chamber 36 will be vented to atmosphere and the chamber 34 will be connected to chamber 2 so that the valve 35 will be held closed, as shown in Figs. 2 and 7.

*Release with the release governing valve in quick release position (Fig. 1).*

Figure 3:
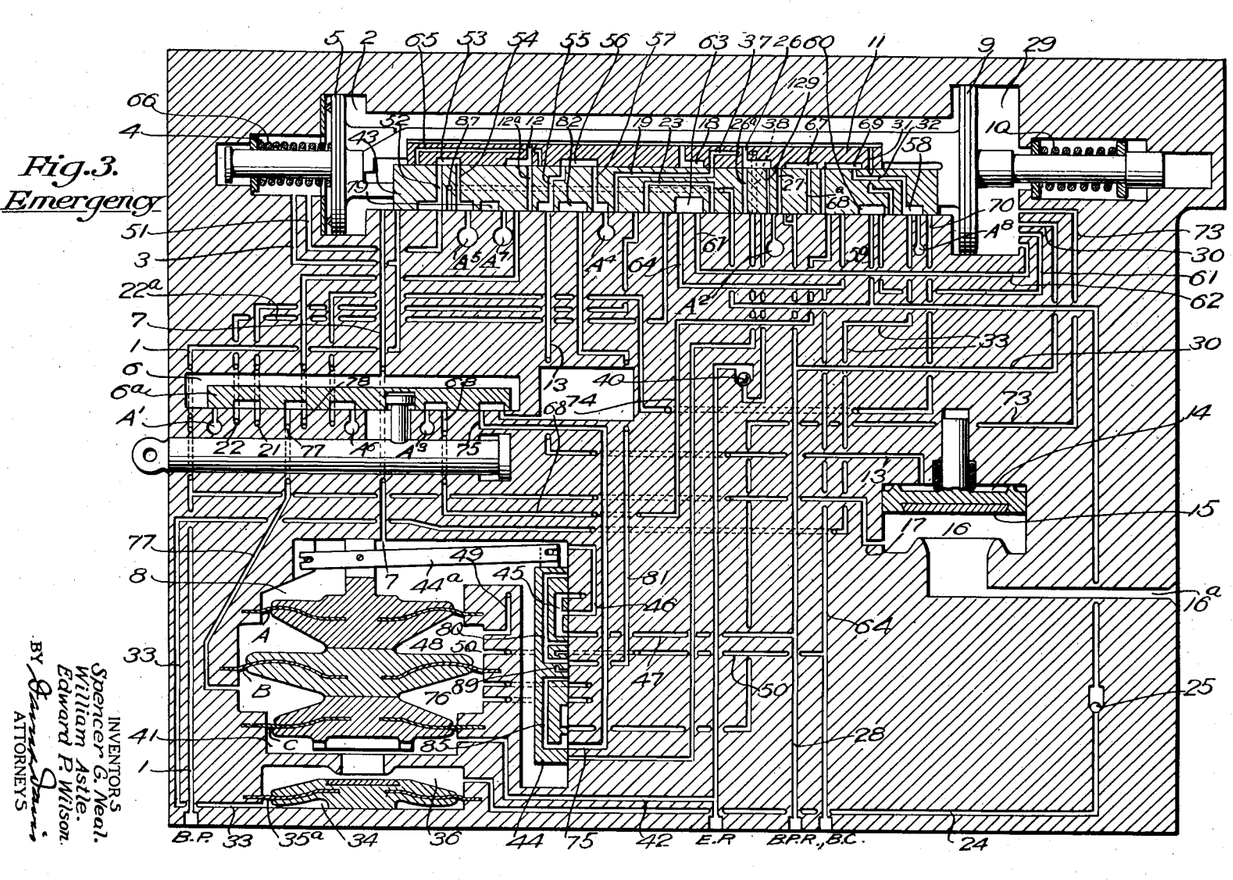
Fig. 3 a view similar to Fig. 1 showing the parts in emergency position.

The release governing valve stem is moved to its innermost position, as shown in Figs. 1, 2 and 3, in order to place the release governing valve 6ª in position for the quick release of brake cylinder pressure. To release the brake cylinder pressure after a service application, the brake pipe pressure is increased. This results in an increase of pressure in chamber 2 above the brake pipe reservoir pressure in chamber 29 and the piston 9 is moved to the right or toward the chamber 29. The piston 9 carries with it the supplemental slide valve 11, the main slide valve remaining stationary, the parts assuming the position shown in Fig. 1. The pressure in chamber 8 will be increased by a flow of air through passage 7 and the diaphragms and the valve 44 will be forced to release position, as shown in Fig. 1. Air will flow from the brake pipe reservoir chamber 29 through passage 73, to a port in the seat of the service valve 44. In the release position of the service valve, cavity 72 thereof connects passage 73 to passage 75 which leads to a port in the release governing valve seat. A cavity in the release governing valve connects port 75 to a quick release chamber 74. This results in a reduction of pressure in chamber 29 and permits the increasing brake pipe pressure in chamber 2 to readily compress spring 10 and carry the piston 9 and the valve 11 to release position. When the release governing valve 70 is in graduated release position the quick release chamber 74 is cut off from the passage 75 and placed in direct communication with the release governing valve chamber 6. This prevents a reduction of brake pipe reservoir pressure in chamber 29 through passage 75 when the service application valve 44 is in release position. When the service application valve 44 is in lap position, as shown in Fig. 2, passage 75 is connected to atmosphere by a cavity in the valve 44 which connects said passage 75 to a passage 86, port and passage 87 in the main slide valve, port 88 in the main slide valve seat and atmospheric port A⁵. By this means the quick release chamber 74 will be vented to atmosphere in the lap position of the service valve. The brake cylinder pressure will be released to atmposphere through the brake cylinder passage 64, port 64ª in the main slide valve, cavity 67 of the supplemental slide valve, port 68ª of the main slide valve, passage 68 which leads to the seat of the release governing valve, cavity 68ᵇ of the release governing valve and atmospheric port A³. Brake cylinder pressure will be released to atmosphere from the brake cylinder chamber 48 to the atmospheric port A⁴, through ports and passages which will be fully set forth in the description of the graduated release operation of the triple valve. Brake cylinder pressure from chamber 76 will be released to atmosphere through atmospheric port A⁵, through ports and passages which will be fully set forth in the description of the graduated release operation of the triple valve.

When the release governing valve is in quick release position the chamber 76 is at all times open to atmosphere through passage 77, a cavity in the release governing valve, passage 78, cavity 79 in the main slide valve and atmospheric port A⁷. When the release governing valve is adjusted to graduated release position passage 77 is closed, as shown in Fig. 6.

With the main and supplemental slide valves in full release position, as illustrated in Fig. 1, the control chamber 34 will be vented to atmosphere through passage 33, port 32 of the main slide valve, cavity 69 of the supplemental slide valve, port and passage 58 of the main slide valve, passage 70 which leads to a port in the release governing valve seat, cavity 70ª of the release governing valve and atmospheric port A⁶. When the chamber 34 is thus vented to atmosphere the emergency reservoir pressure in chamber 41 forces the emergency reservoir valve 35 from its seat and emergency reservoir air flows from chamber 41 into chamber 36 and thence to passage 24 past check valve 25, through passage 23 of the main slide valve, passage 22ª to port 22, which at this time opens into a cavity in the release governing valve which cavity connects said port to the port and passage 21 and passage 20. From passage 20 the air flows directly through the passage 19 in the main slide valve and then through port 18 of the supplemental slide valve into the main brake pipe chamber 2. From chamber 2 the increased air pressure flows through passage 1 to the brake pipe. By thus connecting the emergency reservoir to the brake pipe the brake pipe pressure is raised rapidly throughout the train, securing a quick release of all the brakes on the train.

*Release with the release governing valve in graduated release position (Figs. 1 and 6).*

Figure 6:
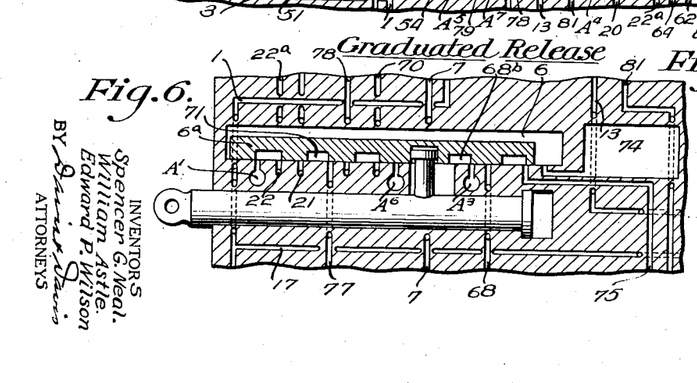
Fig. 6 a detail diagrammatic view of the release governing valve in graduated release position.

The release governing valve stem is drawn to its outer position in order to place the release governing valve in graduated release position, as shown in Fig. 6. With the release governing valve in graduated release position passage 77 from the retention chamber 76 is closed, and the quick release chamber 74 is connected directly to the release governing valve chamber 6, as hereinbefore described. Passage 75 is closed to prevent the venting of air from chamber 29 during release operations. The brake cylinder exhaust port 68 is closed to prevent the escape of brake cylinder pressure through the release governing valve. Passage 70 is closed to prevent the venting of the control chamber 34 when the main and supplemental slide valves are moved to release positions. Port 21 is closed to prevent the passage of emergency reservoir air to chamber 2; and port 22 is connected to atmospheric port A¹ in order to vent the supplemental emergency reservoir chamber 36 to atmosphere.

To release the brake cylinder pressure after a service application of the brakes, and with the release governing valve in graduated release position the brake pipe pressure is increased in the usual way and this results in an increase of pressure in chambers 2, 4 and 8. The emergency piston 9 and the supplemental slide valve will be moved to release position, but this will be an idle operation because the brake cylinder exhaust through the main slide valve has been cut off by the adjustment of the release governing valve. The increase in pressure in chamber 8 will move the actuating diaphragm A downwardly and carry the service slide valve from service lap position, as shown in Fig. 2, to release position, as shown in Fig. 1. The brake cylinder will be vented to atmosphere through passage 50, chamber 48, passage 49, chamber 80 of the service application valve, passage 81, cavity 82 of the main slide valve, and atmospheric port A⁴. From chamber 80 of the valve 44 air flows into the retention chamber 76 through passage 83. From chamber 76 a passage 84 leads to atmosphere through port and passage 85 of the valve 44 and passage 86, port and passage 87 of the main slide valve, passage 88 and atmospheric port A⁵. The purpose of this connection to atmosphere is to assure that the pressure in chamber 76 is slightly below that in brake cylinder chamber 48. If only a partial release of the brake cylinder pressure is desired the brake pipe pressure will only be partially returned to normal, the increase in brake pipe pressure governing the amount of brake cylinder pressure released. When the brake cylinder pressure in chamber 48 has been sufficiently reduced to permit the emergency reservoir pressure in chamber 41 to prevail over the increased brake pipe pressure in chamber 8 the service slide valve 44 will be moved back to lap position. In the lap position of the service valve (see Fig. 2) the retention chamber 76 is in communication with the atmosphere through passage 83, blow-down port and passage 89 of the valve 44, passage 81, cavity 82 of the main slide valve and atmospheric port A⁴. This vent will permit the escape of any pressure trapped in chamber 76 by the movement of the service valve to lap position. This operation may be continued in steps until the pressure in chamber 8 has been stepped up to an equality with the pressure in chamber 41, at which time all of the brake cylinder pressure will have been released.

The blow-down port 89 is quite small so that the pressure in the brake cylinder and in the chamber 76 will be retained at a diminishing pressure for a few seconds. The excess of pressure in chamber 76, that is the differential energy created on the larger controlling diaphragm B, opposes the brake cylinder pressure in chamber 48 and tends to move the service valve back to lap position. If, while there is pressure in the retention chamber 76, the brake pipe pressure is reduced in order to bring about another application of the brakes, or an increased application of the brakes, the service valve will again move to application position and air under pressure will again be delivered to the brake cylinder. It is to be noted that when the service valve again goes to service position the ports 83 and 84 and passage 89 are closed, thereby preventing any further blow-down of pressure from the retention chamber 76 (Fig. 7). The brake cylinder pressure must now be built up an additional amount to overcome the differential energy created on the controlling diaphragm B by the pressure retained in chamber 76. Air will continue to flow into the brake cylinder until the pressure has been built up sufficiently to compensate for the loss of pressure in chamber 8 and also to overcome the pressure in chamber 76. This will result in a higher brake cylinder pressure than would have resulted ordinarily, or in the first instance, from the given brake pipe reduction. Should the engineman again increase his brake pipe pressure for a release, or a partial release of brakes, the valve 44 will again connect the brake cylinder controlling chamber 48 to the retention chamber 76 and to atmosphere. Should the engineman then again reduce the brake pipe pressure the brake cylinder pressure will be still further built up. This is what is known as "cycling" and is the ordinary and usual operation when running down a grade a train equipped with the standard Westinghouse freight brake. When the grade is heavy the cycling operations are frequent and the periods of application-and holding, and release-and re-charging are short, about thirty to sixty seconds, and this short cycling will result in building up a heavy brake cylinder pressure. Where the grade is low the cycling periods are longer, and the slow cycling will not build up as heavy a brake cylinder pressure as will the rapid cycling because the brake cylinder pressure will be released to a lower pressure and likewise the pressure in chamber 76. The amount of pressure retained in the retention chamber 76 will govern the build-up of brake cylinder pressure during the cycling operations. It is manifest therefore that if the release-and-re-charging periods are brief as when braking on heavy grades, a greater pressure will be retained in the retention chamber 76 and consequently a greater brake cylinder pressure must be built up on the next service operation in order to overcome the retained pressure in chamber 76. When the brake cycles are less frequent, as when braking on light grades, the release-and-recharging operations are long and the pressure in chamber 76 has a greater period of time during which it may blow down through the passage 89. The result of this is that the build-up of brake cylinder pressure on the next application-and-holding operation will not be so great because there will not be as high a pressure in chamber 76 as there would have been if the application-and-holding operation followed a short release-and-re-charging operation. It is also manifest that if the release-and-re-charging operation is continued for a considerable period the pressure in chamber 76 will blow down completely and then upon the next service application the brake cylinder pressure will be built up only in proportion to the differential area of the diaphragms for a given brake pipe reduction. When the service valve is in release position the entire brake cylinder pressure is free to blow down. When the said valve is in lap position any pressure in the retention chamber is free to blow down through the restricted port 89. When the valve 44 assumes service position after a release or after it has assumed release lap position, any pressure remaining in the control chamber or in the retention chamber will be trapped therein and cannot blow down. It is therefore clear that the amount of pressure trapped in the brake cylinder and in chamber 48 will depend upon the period of time between the release operation of the service valve and the movement of said valve to lap position; and that the amount of pressure trapped in the retention chamber 76 will depend upon the period of time between the release operation of the valve 44 and the next service application movement of said valve.

*Emergency application position (Figs. 3 and 5).*

An emergency operation of the triple valve is produced by a sudden and great reduction of brake pipe presure in the usual manner. Upon an emergency reduction of brake pipe pressure the pressure in chamber 2 is quickly reduced considerably below pressure in the brake pipe reservoir chamber 29, and the superior pressure in said chamber moves the piston 9 and the main and supplemental slide valves to emergency position (Fig. 3). The movement of the piston 9 compresses the main emergency spring 10 and the supplemental emergency spring 66. As the main slide valve 43 moves toward the left to emergency position communication is established from chamber 4 to atmosphere through passage 51, port and passage 52 of the main slide valve, cavity 53 of the supplemental slide valve, passage 54 of the main slide valve to atmospheric port $A^5$. The rapid reduction of pressure in chamber 4 reduces the resistance to the movement of the piston 9 and permits said piston to be positively and quickly operated to emergency position. The port 52 of the main slide valve is extended on the face of the valve so that it is always in communication with passage 51. A slight movement of the main slide valve toward the left places the port 54 in communication with the atmospheric port $A^5$ and these ports remain in communication during the completion of the movement of the main slide valve to emergency position. The chamber 14 above the brake pipe vent valve 15 is vented to atmosphere through passage 13, port 55 of the main slide valve, cavity 56 of the supplemental slide valve, port 57 of the main slide valve and atmospheric port $A^4$. The brake pipe pressure below this valve thereupon opens it and the brake pipe is vented to atmosphere directly through passage 17, chamber 16 and the large exhaust port 16ᵃ. The control chamber 34 under the emergency reservoir valve 35, is vented to atmosphere through passage 33, passage 58 of the main slide valve and atmospheric port A⁸. The emergency reservoir pressure in chamber 41 forces valve 35 from its seat and emergency reservoir air will flow from chamber 41 into chamber 36, then through passage 24, past check valve 25, passage 59, cavity 60 of the main slide valve, through passage 61 into the brake pipe reservoir chamber 29. From chamber 29 the emergency reservoir air and the brake pipe reservoir air will flow through passage 62, cavity 63 in the main slide valve and passage 64 to the brake cylinder.

The service application valve will go to service position and there will be an equalization of pressures in chambers 8, 48 and 41. The emergency brake cylinder pressure will pass through passage 50, chamber 48 and thence through passage 49 to the mingling chamber 45 and thence to chamber 8 through passage 46. Chamber 8 is connected to chamber 2 by passage 7. There will therefore be equalized brake cylinder pressure on opposite sides of piston 9 and also in chambers 8, 48 and 41. In the emergency position of the main slide valve the brake pipe passage 1 is closed.

*Emergency lap position.*

Figures 4, 5:
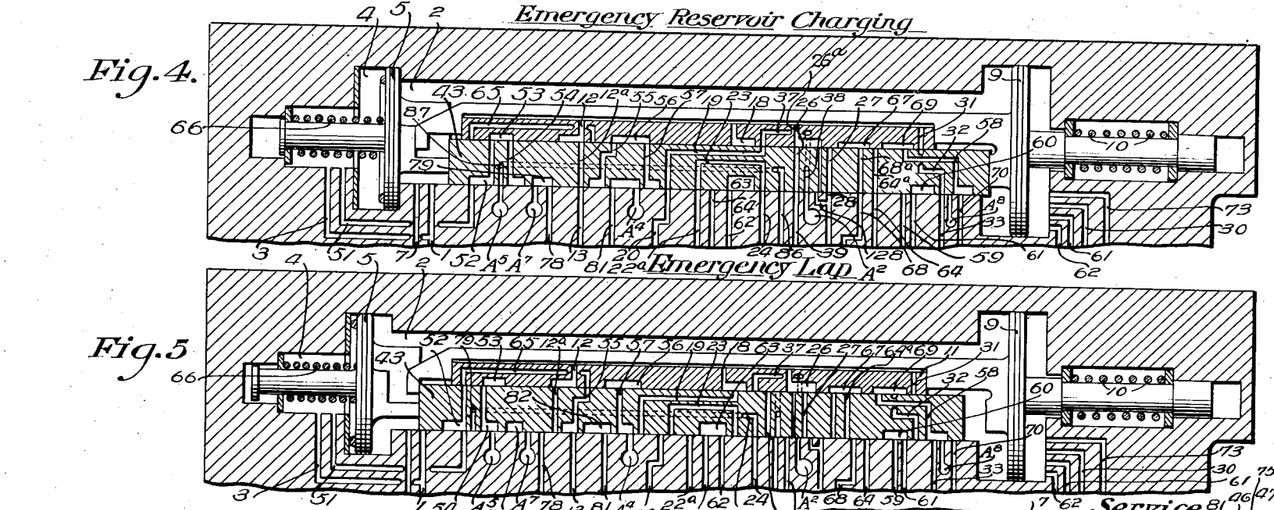
Fig. 4 a detail diagrammatic view of the main and supplemental slide valves in emergency reservoir charging position.
Fig. 5 a view similar to Fig. 4 showing the supplemental slide valve in emergency lap position.

When the pressures have equalized on opposite sides of the piston 9 the main emergency spring 10 moves the piston 9 and the supplemental slide valve 11 to emergency lap position as shown in Fig. 5. In this position of the supplemental slide valve, chamber 14 above the valve 15 is cut off from the atmospheric port A⁴ and placed in communication with the brake pipe through passage 13, port 55 of the main slide valve, passage 56 of the supplemental slide valve, port 52 of the main slide valve, and passage 51 to the chamber 4. Chamber 4 is in communication with the brake pipe through passages 3 and 1.

To move the triple valve to release position from emergency lap position the brake pipe pressure is increased in the usual manner. This results in an increase in pressure in chamber 4. When the pressure in chamber 4 plus the force of the spring 66 overbalances the emergency brake cylinder pressure in chamber 2 the supplemental emergency piston 5 and the main slide valve 43 will be moved to the right to full release and charging position as shown in Fig. 1. This movement of the main slide valve uncovers passage 1 and permits the increasing brake pipe pressure to flow into chamber 2 and from chamber 2 through passage 7 to chamber 8. The increase in pressure in chamber 8 forces the actuating diaphragm and the service application valve 44 to release position. The piston 9 and the supplemental slide valve will be moved to full release position, compressing the main emergency spring 10, as shown in Fig. 1. The parts are now in full release and brake pipe reservoir charging position, as shown in Fig. 1, and the reservoir will be re-charged as hereinbefore described.

What we claim is:

1. A triple valve for air brake apparatus comprising a service valve operating upon a service reduction of brake pipe pressure to connect a brake pipe and a brake pipe reservoir to the brake cylinder for a service application of the brakes, and main and supplemental slide valves responding only to a sudden and prolonged reduction of brake pipe pressure to place the emergency reservoir in communication with the brake cylinder for an emergency application of the brakes, the service valve and the main and supplemental slide valves moving to release position upon an increase of brake pressure after an application of the brakes.

2. A triple valve in accordance with claim 1, combined with means whereby the main slide valve in emergency position connects the brake pipe reservoir and the emergency reservoir to the brake cylinder and cuts off the brake pipe reservoir from the brake pipe.

3. A triple valve in accordance with claim 2, combined with means whereby the main and supplemental slide valves in release position connect the emergency reservoir to the brake pipe for a quick release of the brakes.

4. A triple valve in accordance with claim 3, combined with a release governing valve having a quick-release position and a graduated-release position, said valve in graduated release position preventing the emergency reservoir air passing to brake pipe when the main slide valve is in release position, and in quick-release position permitting the main and supplemental slide valves to connect the emergency reservoir to the brake pipe and the brake cylinder to an exhaust port through the said release governing valve.

5. A triple valve in accordance with claim 1, combined with means whereby when the main and supplemental slide valves are in release position the brake pipe will be connected to the brake pipe reservoir and upon an equalization of pressures in the brake pipe and the brake pipe reservoir the supplemental slide valve will be moved into position to connect the brake pipe to the emergency reservoir.

6. A triple valve for air brake apparatus comprising a service valve subject to brake pipe, brake cylinder and emergency reservoir pressures and operating upon a reduction of brake pipe pressure to place the brake pipe and a brake pipe reservoir in communication with the brake cylinder for a service application of the brakes the brake cylinder pressure assisting the brake pipe pressure in moving the service valve to lap position, main and supplemental slide valves subject to brake pipe and brake pipe reservoir pressures and operated by brake pipe reservoir pressure to emergency position only upon a sudden and prolonged reduction of brake pipe pressure said slide valves in emergency position connecting the emergency and the brake pipe reservoirs to the brake cylinder for an emergency application of the brakes.

7. A triple valve in accordance with claim 6, and provided with means whereby the main slide valve in emergency position will cut off communication between the brake pipe reservoir and the brake pipe.

8. A triple valve in accordance with claim 6, provided with means whereby the main slide valve in full release position will connect the emergency reservoir to the brake pipe for a quick release of the brakes.

9. A triple valve in accordance with claim 6, provided with a release governing valve having a graduated release position and a quick release position, said valve in its graduated release position rendering the main exhaust port of the main slide valve ineffective in its release position and preventing the flow of emergency reservoir air to the brake pipe whereby the release of brake cylinder pressure will be controlled by the service application valve, said release governing valve in its quick release position rendering the main slide valve effective in its full release position to admit the emergency reservoir air into the brake pipe for a quick release of the brakes.

10. A triple valve operating upon a slow reduction of brake pipe pressure to admit air to the brake cylinder for a service application of the brakes and operating upon a sudden reduction of brake pipe pressure to admit emergency reservoir air to the brake cylinder for an emergency application of the brakes and operating upon an increase in brake pipe pressure to connect the brake cylinder to atmosphere and provided with a service application valve operating upon a slow reduction of brake pipe pressure to admit air to the brake cylinder for a service application of the brakes, said service application valve operating upon an increase in brake pipe pressure to connect the brake cylinder to atmosphere, a main slide valve, a supplemental slide valve, means operating upon a sudden reduction of brake pipe pressure to move the main and supplemental slide valves to emergency position to connect the emergency reservoir to the brake cylinder, and means whereby an increase in brake pipe pressure will move the service application valve and the main and supplemental slide valves to release position.

11. A triple valve in accordance with claim 10, provided with an emergency reservoir valve, means whereby the main slide valve in emergency position will open said valve and permit the emergency reservoir air to flow to the brake cylinder, and means whereby the main slide valve in full-release position will open said emergency reservoir valve and permit the emergency reservoir air to flow to the brake pipe.

12. A triple valve in accordance with claim 11 provided with a release governing valve having a quick-release position and a graduated-release position, said valve in graduated-release position preventing the opening of the emergency reservoir valve when the main slide valve is in full release position.

13. A triple valve in accordance with claim 10, means being provided whereby the service application valve in service position will connect the brake pipe and a brake pipe augmenting reservoir to the brake cylinder for a service application of the brakes and with means whereby the main slide valve in emergency position connects the brake pipe reservoir and the emergency reservoir to the brake cylinder for an emergency application of the brakes, the main slide valve in emergency position closing communication between the brake pipe reservoir and the brake pipe.

14. A triple valve in accordance with claim 13, provided with a brake pipe vent valve, and with means whereby when the main and supplemental slide valves are in emergency position the said vent valve will be opened and the brake pipe vented to atmosphere.

15. A triple valve operating upon a reduction of brake pipe pressure to admit air to a brake cylinder for an application of the brakes and operating upon an increase in brake pipe pressure to connect the brake cylinder to atmosphere and comprising a service application valve subject to brake pipe, brake cylinder and emergency reservoir pressures, said application valve operating upon a decrease in brake pipe pressure to connect the brake pipe and brake pipe reservoir to the brake cylinder for a service application of the brakes and operating upon an increase in brake pipe pressure to connect the brake cylinder to atmosphere, main and supplemental slide valves, a piston operatively connected thereto, means whereby a sudden reduction in brake pipe pressure will move the main and supplemental slide valves to emergency position to connect the emergency reservoir to the brake cylinder, and means whereby an increase in brake pipe pressure will move the main and supplemental slide valves and the piston connected thereto to release position.

16. A triple valve in accordance with claim 13, provided with a release governing valve having a graduated release position and a quick release position, said valve in its graduated release position closing the main brake cylinder exhaust through the main slide valve, and in its quick release position rendering the main slide valve operative in release operations.

17. A triple valve in accordance with claim 16, provided with an emergency reservoir valve, means whereby the main slide valve in emergency position will open said valve and permit the emergency reservoir air to flow to the brake cylinder, and means whereby the main slide valve in full release position will open said emergency reservoir valve and permit the emergency reservoir air to flow to the brake pipe for a quick release of the brakes.

18. A triple valve in accordance with claim 17, provided with means whereby the release governing valve in graduated release position will prevent the opening of the emergency reservoir valve when the main slide valve is in full release position.

19. A triple valve operating upon a reduction of brake pipe pressure to admit air to a brake cylinder for an application of the brakes and operating upon an increase in brake pipe pressure to connect the brake cylinder to atmosphere, and provided with a service application valve subject to brake pipe, brake cylinder and emergency reservoir pressures, said application valve operating upon an increase in brake pipe pressure after an application of the brakes to admit brake cylinder pressure to oppose the brake cylinder pressure introduced into said application valve structure upon the application of the brakes, and means to permit said latter pressure to slowly blow down to atmosphere in the release and lap positions of the application valve.

20. A triple valve operating upon a reduction of brake pipe pressure to admit air to the brake cylinder for an application of the brakes and operating upon an increase in brake pipe pressure to connect the brake cylinder to atmosphere, and provided with a service application valve operating means consisting of an actuating diaphragm, an equalizing diaphragm, an emergency diaphragm, an actuating chamber in direct communication with the brake pipe, an equalizing chamber between the actuating diaphragm and the equalizing diaphragm and in communication with the brake cylinder, a retention chamber between the equalizing diaphragm and the emergency diaphragm and an emergency reservoir chamber in communication with the emergency reservoir, and an application valve operatively connected to said diaphragms and in its application position admitting air to the equalizing chamber and the brake cylinder, in its release position connecting the equalizing chamber to the retention chamber and in its lap position closing said communication.

21. A triple valve operating upon a reduction of brake pipe pressure to admit air to the brake cylinder for an application of the brakes and operating upon an increasee in brake pipe pressure to connect the brake cylinder to atmosphere, and provided with a service application valve operating means consisting of an actuating diaphragm, an equalizing diaphragm, an emergency diaphragm, an actuating chamber in direct communication with the brake pipe, an equalizing chamber between the actuating diaphragm and the equalizing diaphragm and in communication with the brake cylinder, a retention chamber between the equalizing diaphragm and the emergency diaphragm and an emergency reservoir chamber in communication with the emergency reservoir, a service application valve operatively connected to said diaphragms and in its application position admitting air to the equalizing chamber and brake cylinder, in its release position connecting the equalizing chamber to the retention chamber and in its lap position closing said communication, and means to permit the pressure in the retention chamber to slowly blow down to atmosphere in the release position and in the lap position of the said service valve.

22. In a triple valve operating upon a reduction of brake pipe pressure to admit air to the brake cylinder for an application of the brakes and operating upon an increase in pressure to exhaust air from the brake cylinder, and a service application valve operated by rapidly repeated increases and decreases in brake pipe pressure to build up the brake cylinder pressure.

23. In a triple valve operating upon a reduction of brake pipe pressure to admit air to the brake cylinder for an application of the brakes and operating upon an increase in brake pipe pressure to connect the brake cylinder to atmosphere, a service application valve subject to brake pipe, brake cylinder and emergency reservoir pressures, the brake cylinder pressure moving said service valve to lap position, and means whereby the brake cylinder pressure will be built up by cycling operations.

24. In a triple valve operating upon a reduction of brake pipe pressure to admit air to the brake cylinder for an application of the brakes and operating upon an increase in brake pipe pressure to connect the brake cylinder to atmosphere and a service application valve to build up brake cylinder pressure by cycling operations, the extent of the build-up of brake cylinder pressure depending upon the rapidity of the cycling operations.

25. In a triple valve operating upon a reduction of brake pipe pressure to admit air to the brake cyinder for an application of the brakes and operating upon an increase in brake pipe pressure to connect the brake cylinder to atmosphere, a service application valve to build up brake cylinder pressure by cycling operations, the extent of the build-up of brake cylinder pressure depending upon the rapidity of the cycling operations, and a release governing valve having a graduated-release position and a quick-release position, said valve in its quick-release position preventing the build-up of brake cylinder pressure and in its graduated-release position permitting the said build-up of brake cylinder pressure.

26. In a triple valve operating upon a reduction of brake pipe pressure to admit air to the brake cylinder for an application of the brakes and operating upon an increase in brake pipe pressure to connect the brake cylinder to atmosphere, a service application valve having an actuating diaphragm, an equalizing diaphragm, an emergency diaphragm, an actuating chamber in direct communication with the brake pipe, an equalizing chamber between the actuating diaphragm and the equalizing diaphragm and in communication with the brake cylinder, a retention chamber between the equalizing diaphragm and the emergency diaphragm and an emergency reservoir chamber in communication with the emergency reservoir, the service application valve being operatively connected to said diaphragms and in its application position admitting air to the equalizing chamber and the brake cylinder, in its release position connecting the equalizing chamber to the retention chamber and in its lap position closing said communication, and a release governing valve having a graduated-release position and a quick-release position, said valve in its quick-release position providing a free quick exhaust from the retention chamber and in its graduated-release position closing said exhaust from said chamber.

27. In a triple valve operating to service position upon a reduction of brake pipe pressure and to release position upon an increase in brake pipe pressure, a service application valve, a retention chamber, means operating upon an increase in brake pipe pressure to move the said service valve to release position to connect the brake cylinder to the retention chamber and to atmosphere, and means to move said service valve to lap position to close communication between the brake cylinder and the retention chamber.

28. A triple valve operating upon a reduction of brake pipe pressure to admit air to a brake cylinder for an application of the brakes and operating upon an increase in brake pipe pressure to connect the brake cylinder to atmosphere and comprising a service application valve subject to brake pipe, brake cylinder, and emergency reservoir pressures, said application valve operating upon a decrease in brake pipe pressure to connect the brake pipe and brake pipe reservoir to the brake cylinder for a service application of the brakes and operating upon an increase in brake pipe pressure to connect the brake cylinder to atmosphere, a main brake pipe chamber, main and supplemental slide valves in said chamber, an emergency and release piston operatively connected to said valves and subject on one side to the pressure in the main brake pipe chamber, a brake pipe reservoir chamber on the opposite side of said piston from the main brake pipe chamber, a supplemental emergency piston connected to the main slide valve and subject to the pressure in the main brake pipe chamber, said supplemental piston being smaller in area than the emergency and release piston, a supplemental brake pipe chamber on the opposite side of the supplemental emergency piston from the main brake pipe chamber, whereby upon a sudden reduction in brake pipe pressure in the main brake pipe chamber the pressure in the brake pipe reservoir chamber will move the main and supplemental slide valves to emergency position, means whereby the supplemental brake pipe chamber will be vented to atmosphere during the movement of the main and supplemental slide valves to emergency position, means whereby the emergency reservoir will be connected to the brake pipe reservoir chamber through the main slide valve when said valve is in emergency position, and means whereby emergency reservoir and brake pipe reservoir air may flow from the brake pipe reservoir chamber to the brake cylinder when the main slide valve is in emergency position.

29. A triple valve in accordance with claim 28, provided with a brake pipe vent valve and means whereby when the main and supplemental slide valves are in emergency position said vent valve will be opened and the brake pipe vented to atmosphere.

30. A triple valve in accordance with claim 29, provided with means whereby upon an equalization of emergency brake cylinder pressure in the main brake pipe chamber and in the brake pipe reservoir chamber the supplemental slide valve will be moved to emergency lap position thereby closing the vent from the supplemental brake pipe chamber and also permitting the brake pipe vent valve to be closed by brake pipe pressure.

31. A triple valve in accordance with claim 30, provided with means whereby the service application valve when moved to release position by an increase in brake pipe pressure will connect the brake pipe reservoir chamber to a quick release chamber to thereby reduce the pressure in said brake pipe reservoir chamber to assist the movement of the main and supplemental slide valves to release position.

32. A triple valve operating upon a reduction of brake pipe pressure to admit air to the brake cylinder for an application of the brakes and operating upon an increase in brake pipe pressure to connect the brake cylinder to atmosphere, and provided with a service application valve operating means consisting of an actuating diaphragm, an equalizing diaphragm, an emergency diaphragm, an actuating chamber in direct communication with the brake pipe, an equalizing chamber between the actuating diaphragm and the equalizing diaphragm and in communication with the brake cylinder, a retention chamber between the equalizing diaphragm and the emergency diaphragm and an emergency reservoir chamber in communication with the emergency reservoir, and an application valve operatively connected to said diaphragms and in its application position admitting brake pipe and brake pipe reservoir air to the equalizing chamber and the brake cylinder, in its release position connecting the equalizing chamber to the retention chamber and in its lap position closing said communication, a main brake pipe chamber, main and supplemental slide valves in said chamber, an emergency and release piston operatively connected to said valves and subject on one side to the pressure in the main brake pipe chamber, a brake pipe reservoir chamber on the opposite side of said piston from the main brake pipe chamber, a supplemental emergency piston connected to the main slide valve and subject to the pressure in the main brake pipe chamber, said supplemental piston being smaller in area than the emergency and release piston, a supplemental brake pipe chamber on the opposite side of the supplemental emergency piston from the main brake pipe chamber, whereby upon a sudden reduction in brake pipe pressure in the main brake pipe chamber the pressure in the brake pipe reservoir chamber will move the main and supplemental slide valves to emergency position, means whereby the supplemental brake pipe chamber will be vented to atmosphere during the movement of the main and supplemental slide valves to emergency position, means whereby the emergency reservoir will be connected to the brake pipe reservoir chamber through the main slide valve when said valve is in emergency position, and means whereby emergency reservoir and brake pipe reservoir air may flow from the brake pipe reservoir chamber to the brake cylinder when the main slide is in emergency position.

33. A triple valve in accordance with claim 32, provided with an emergency reservoir control chamber, an emergency reservoir valve controlling communication between the emergency reservoir chamber and the control chamber, and means whereby the main slide valve in emergency position will open the control valve to permit emergency reservoir air to flow to the brake cylinder, and means whereby the main slide valve in release position will open the control valve and permit emergency reservoir air to flow to the brake pipe.

34. A triple valve in accordance with claim 33, provided with a release governing valve having a quick release position and a graduated release position, said valve in graduated release position preventing the opening of the emergency reservoir valve when the main slide valve is in full release position.

35. A triple valve in accordance with claim 32, provided with a brake pipe vent valve, and with means whereby when the main and supplemental slide valves are in emergency position, the said vent valve will be opened and the brake pipe vented to atmosphere.

36. A triple valve in accordance with claim 10 and provided with a manually operable release-governing valve having a quick-release position and a graduated-release position, said valve in quick-release position opening a main brake cylinder exhaust port through the main slide valve to atmosphere and in its graduated-release position closing said main exhaust port, whereby the application valve will control the exhaust of brake cylinder pressure when the release-governing valve is in graduated-release position, and means whereby the main slide valve in release position will control brake cylinder exhaust through the application valve and a secondary exhaust port.

37. A triple valve for air brake apparatus comprising a service application valve subject to brake pipe, brake cylinder and emergency reservoir pressures and operating upon a reduction of brake pipe pressure to place the brake pipe and a brake pipe reservoir in communication with the brake cylinder for a service application of the brakes, the brake cylinder pressure assisting the brake pipe pressure in moving the service valve to lap position; and a main slide valve inoperative under a service reduction in brake pipe pressure and adapted to be operated to emergency position only upon a sudden and prolonged reduction of brake pipe pressure, said main slide valve in emergency position connecting an emergency reservoir to the brake cylinder for an emergency application of the brakes, the service valve and the main slide valve moving to release position upon an increase of brake pipe pressure after an application of the brakes.

38. A triple valve for air brake apparatus comprising a service application valve subject to brake pipe, brake cylinder and emergency reservoir pressures and operating upon a reduction of brake pipe pressure to place one reservoir in communication with the brake cylinder for a service application of the brakes, the brake cylinder pressure assisting the brake pipe pressure in moving the service valve to lap position; and a main slide valve inoperative under a service reduction of brake pipe pressure and adapted to be operated to emergency position only upon a sudden and prolonged reduction of brake pipe pressure, said main slide valve in emergency position connecting another reservoir to the brake cylinder for an emergency application of the brakes, the service valve and the main slide valve moving to release position upon an increase of brake pipe pressure after an application of the brakes.

39. A triple valve for air brake apparatus comprising a service application valve subject to brake pipe, brake cylinder and emergency reservoir pressures and operating upon a reduction of brake pipe pressure to place one reservoir in communication with the brake cylinder for a service application of the brakes, the brake cylinder pressure assisting the brake pipe pressure in moving the service valve to lap position; main and supplemental slide valves inoperative under a service reduction of brake pipe pressure and adapted to be operated to emergency position only upon a sudden and prolonged reduction of brake pipe pressure, said main slide valve in emergency position connecting another reservoir to the brake cylinder for an emergency application of the brakes, the service valve and the main slide valve moving to release position upon an increase of brake pipe pressure after an application of the brakes; and means whereby the main and supplemental slide valves in release position connect the emergency application reservoir to the brake pipe for a quick release of the brakes.

40. A triple valve in accordance with claim 39, combined with a release-governing valve having a quick-release position and a graduated-release position, said valve in graduated-release position preventing the emergency reservoir air passing to the brake pipe when the main slide valve is in release position, and in quick-release position permitting the main and supplemental slide valves to connect the emergency reservoir to the brake pipe and the brake cylinder to an exhaust port through the said release-governing valve.

41. A triple valve in accordance with claim 38 and provided with a manually operable release-governing valve having a quick-release position and a graduated-release position, said valve in quick-release position opening a main brake cylinder exhaust port through the main slide valve to atmosphere and in its graduated-release position closing said main exhaust port, whereby the application valve will control the exhaust of brake cylinder pressure when the release-governing valve is in graduated-release position; and means whereby the main slide valve in release position will control brake cylinder exhaust through the application valve and a secondary exhaust port.

42. A triple valve for air brake apparatus comprising a service valve subject to brake pipe, brake cylinder and emergency reservoir pressures and operating upon a reduction of brake pipe pressure to place a source of braking pressure in communication with the brake cylinder for a service application of the brakes, the brake cylinder pressure assisting the brake pipe pressure in moving the service valve to lap position, a slide valve, and means operating upon an emergency reduction of brake pipe pressure to move the slide valve to emergency position, said slide valve in emergency position connecting an emergency reservoir to the brake cylinder for an emergency application of the brakes.

43. A triple valve in accordance with claim 42, combined with a release-governing valve having a quick-release position and a graduated-release position, said valve in graduated-release position preventing the emergency reservoir air passing to the brake pipe when the main slide valve is in release position, and in quick-release position permitting the main and supplemental slide valves to connect the emergency reservoir to the brake pipe and the brake cylinder to an exhaust port through the said release-governing valve.

44. A triple valve in accordance with claim 42, and provided with a manually operable release-governing valve having a quick-release position and a graduated-release position, said valve in quick-release position opening a main brake cylinder exhaust port through the main slide valve to atmosphere and in its graduated-release position closing said main exhaust port, whereby the application valve will control the exhaust of brake cylinder pressure when the release-governing valve is in graduated-release position; and means whereby the main slide valve in release position will control brake cylinder exhaust through the application valve and a secondary exhaust port.

45. A triple valve for air brake apparatus comprising a service valve subject to brake pipe, brake cylinder and emergency reservoir pressures and operating upon a reduction of brake pipe pressure to place a brake pipe and a brake pipe reservoir in communication with the brake cylinder for a service application of the brakes, the brake cylinder pressure assisting the brake pipe pressure in moving the service valve to lap position, a slide valve, and means operating upon an emergency reduction of brake pipe pressure to move the slide valve to emergency position, said slide valve in emergency position connecting an emergency reservoir to the brake cylinder independently of the service valve for an emergency application of the brakes.

46. A triple valve for air brake apparatus comprising a casing formed with a main slide valve chamber, a slide valve therein, a service valve subject to brake pipe, brake cylinder and emergency reservoir pressures and operating upon a reduction of brake pipe pressure to place a source of braking pressure in communication with the brake cylinder independently of the slide valve for a service application of the brakes, the brake cylinder pressure assisting the brake pipe pressure in moving the service valve to lap position, and means operating upon an emergency reduction of brake pipe pressure to move the main slide valve to emergency position, said slide valve in emergency position connecting an emergency reservoir to the brake cylinder independently of the service valve for an emergency application of the brakes.

47. A triple valve for air brake apparatus comprising a casing formed with a main slide valve chamber, a slide valve therein, a service valve subject to brake pipe, brake cylinder and emergency reservoir pressures and operating upon a reduction of brake pipe pressure to place a brake pipe and a brake pipe reservoir in communication with the brake cylinder independently of the slide valve for a service application of the brakes, the brake cylinder pressure assisting the brake pipe pressure in moving the service valve to lap position, and means operating upon an emergency reduction of brake pipe pressure to move the main slide valve to emergency position, said slide valve in emergency position connecting an emergency reservoir to the brake cylinder independently of the service valve for an emergency application of the brakes.

48. A triple valve for air brake apparatus comprising a casing formed with a main slide valve chamber, a slide valve therein, a service valve subject to brake pipe, brake cylinder and emergency reservoir pressures and operating upon a reduction of brake pipe pressure to place a source of braking pressure in communication with the brake cylinder independently of the slide valve for a service application of the brakes, means whereby the brake cylinder pressure will assist the brake pipe pressure to move the service valve to lap position when the brake cylinder pressure is at a predetermined ratio to the brake pipe reduction, and means operating upon an emergency reduction of brake pipe pressure to move the main slide valve to emergency position, said slide valve in emergency position connecting an emergency reservoir to the brake cylinder independently of the service valve for an emergency application of the brakes.

49. A triple valve provided with a main slide valve, a service application valve operating upon a service reduction of brake pipe pressure to place a source of braking pressure in communication with the brake cylinder for a service application of the brakes, a manually operable release governing valve having a quick release position and a graduated release position, means whereby the main slide valve in release position will co-operate with the release governing valve in quick release position to connect the brake cylinder to atmosphere through a main exhaust port, means whereby the release governing valve in graduated release position will close the main exhaust port, and means whereby the service application valve and the main slide valve will co-operate to slowly release brake cylinder pressure in the release positions of said valves.

50. A triple valve provided with a main slide valve, a service application valve subject to brake pipe, brake cylinder and emergency reservoir pressures and operating upon a service reduction of brake pipe pressure to place a source of braking pressure in communication with the brake cylinder for a service application of the brakes, the brake cylinder pressure assisting the brake pipe pressure in moving the service valve to lap position, a manually operable release governing valve having a quick release position and a graduated release position, means whereby the main slide valve in release position will co-operate with the release governing valve in quick release position to connect the brake cylinder to atmosphere through a main exhaust port, means whereby the release governing valve in graduated release position will close the main exhaust port, and means whereby the service application valve and the main slide valve will co-operate to slowly release brake cylinder pressure in the release positions of said valves.

51. A triple valve for air brake apparatus comprising a service application valve subject to brake pipe, brake cylinder and emergency reservoir pressures and operating upon a reduction of brake pipe pressure to place a source of braking pressure in communication with the brake cylinder for a service application of the brakes, the brake cylinder pressure assisting the brake pipe pressure in moving the service valve to lap position; and means operating upon an emergency reduction of brake pipe pressure to connect an emergency reservoir to the brake cylinder independently of the service valve for an emergency application of the brakes.

In testimony whereof we hereunto affix our signatures.

SPENCER G. NEAL.
WILLIAM ASTLE.
EDWARD P. WILSON.